(12) United States Patent
Gonze et al.

(10) Patent No.: US 8,151,557 B2
(45) Date of Patent: Apr. 10, 2012

(54) ELECTRICALLY HEATED DPF START-UP STRATEGY

(75) Inventors: Eugene V. Gonze, Pinckney, MI (US); Michael J. Paratore, Jr., Howell, MI (US); Frank Ament, Troy, MI (US)

(73) Assignee: GM Global Technology Operations LLC

( * ) Notice: Subject to any disclaimer, the term of this patent is extended or adjusted under 35 U.S.C. 154(b) by 1057 days.

(21) Appl. No.: 11/890,766

(22) Filed: Aug. 7, 2007

(65) Prior Publication Data
US 2009/0038295 A1 Feb. 12, 2009

(51) Int. Cl.
*F01N 3/00* (2006.01)
*F01N 3/10* (2006.01)

(52) U.S. Cl. ............ 60/295; 60/274; 60/285; 60/286; 60/297; 60/303

(58) Field of Classification Search ........... 60/273, 60/285–288, 292, 295, 297, 303, 274; 95/283
See application file for complete search history.

(56) References Cited

U.S. PATENT DOCUMENTS

| | | | |
|---|---|---|---|
| 4,505,726 A | 3/1985 | Takeuchi | |
| 4,516,993 A | 5/1985 | Takeuchi | |
| 4,549,398 A * | 10/1985 | Oishi et al. | 60/286 |
| 4,558,565 A * | 12/1985 | Kojima et al. | 60/286 |
| 2004/0128985 A1 * | 7/2004 | Shimasaki et al. | 60/286 |
| 2006/0144038 A1 * | 7/2006 | Miura | 60/286 |
| 2007/0056263 A1 * | 3/2007 | Roach et al. | 60/272 |
| 2007/0251216 A1 | 11/2007 | Easley et al. | |
| 2008/0163610 A1 * | 7/2008 | Baird et al. | 60/295 |
| 2008/0276602 A1 * | 11/2008 | McCabe et al. | 60/295 |

FOREIGN PATENT DOCUMENTS

| | | |
|---|---|---|
| CN | 1920267 A | 2/2007 |
| DE | 10 2006 038 922 A1 | 3/2007 |
| JP | 62157214 A * | 7/1987 |
| JP | 2001280121 A * | 10/2001 |

OTHER PUBLICATIONS

Takeshima, English Abstract of JP 62-157214 A, Jul. 13, 1987.*
Tabata, English Abstract of JP 2001-280121 A, Oct. 10, 2001.*

* cited by examiner

*Primary Examiner* — Thomas Denion
*Assistant Examiner* — Audrey K Bradley

(57) ABSTRACT

An exhaust system that processes exhaust generated by an engine has a diesel particulate filter (DPF) that is disposed downstream of the engine and that filters particulates in the exhaust. An electrical heater is disposed upstream of the DPF and selectively heats the exhaust to initiate combustion of the particulates. Heat generated by combustion of particulates in the heater induces combustion of particulates within the DPF. A control module selectively enables current flow to the electrical heater for an initial period of a DPF regeneration cycle, and limits exhaust flow while the electrical heater is heating to a predetermined soot combustion temperature.

19 Claims, 5 Drawing Sheets

ELECTRICALLY HEATED DPF START-UP STRATEGY

STATEMENT OF GOVERNMENT RIGHTS

This invention was produced pursuant to U.S. Government Contract No. DE-FC-04-03 AL67635 with the Department of Energy (DoE). The U.S. Government has certain rights in this invention.

FIELD

The present invention relates to diesel engines, and more particularly to diesel particulate filter (DPF) start-up.

BACKGROUND

The statements in this section merely provide background information related to the present disclosure and may not constitute prior art.

Diesel engines have higher efficiency than gasoline engines due to the increased compression ratio of the diesel combustion process and the higher energy density of diesel fuel. As a result, a diesel engine provides improved gas mileage as compared to an equivalently sized gasoline engine.

The diesel combustion cycle produces particulates that are typically filtered from the exhaust gases. A diesel particulate filter (DPF) can be disposed in the exhaust stream to filter the diesel particulates from the exhaust. Over time, however, the DPF becomes full and must be regenerated to remove the trapped diesel particulates. During regeneration, the diesel particulates are burned within the DPF to enable the DPF to continue its filtering function.

SUMMARY

An exhaust system that processes exhaust generated by an engine has a diesel particulate filter (DPF) that is disposed downstream of the engine and that filters particulates in the exhaust. An electrical heater is disposed upstream of the DPF and selectively heats the exhaust to initiate combustion of the particulates. Heat generated by combustion of particulates in the heater induces combustion of particulates within the DPF. A control module selectively enables current flow to the electrical heater for an initial period of a DPF regeneration cycle, and limits exhaust flow while the electrical heater is heating to a predetermined soot combustion temperature.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
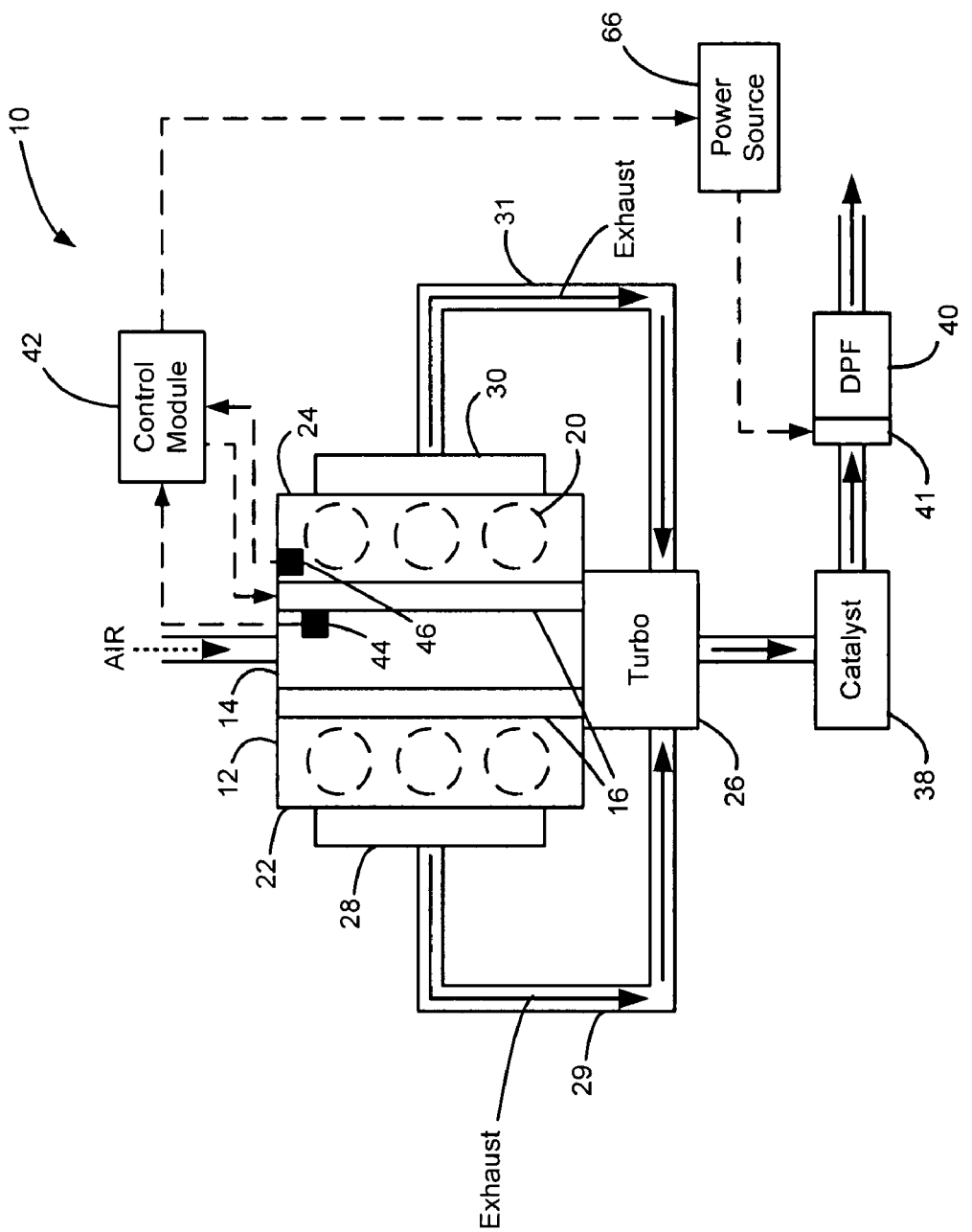
FIG. 1 is a schematic view of an exemplary diesel engine system that includes a diesel particular filter (DPF) regeneration system.

The following description is merely exemplary in nature and is not intended to limit the present disclosure, application, or uses. It should be understood that throughout the drawings, corresponding reference numerals indicate or corresponding parts and features.

As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1 an exemplary diesel engine system 10 is schematically illustrated. It is appreciated that the diesel engine system 10 is merely exemplary in nature and that the diesel particulate filter (DPF) regeneration system described herein can be implemented in various diesel engine systems implementing a DPF. The diesel engine system 10 can include a diesel engine 12, an intake manifold 14, a common rail fuel injection system 16 and an exhaust system 18. The exemplary engine 12 includes six cylinders 20 configured in adjacent cylinder banks 22, 24 in V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is also anticipated that DPF regeneration control can be implemented in an inline-type cylinder configuration, as discussed in further detail below.

Air can be drawn into the intake manifold 14 through a throttle (not shown). Air can be drawn into the cylinders 20 from the intake manifold 14 and compressed therein. Fuel can be injected into cylinder 20 by the common rail injection system 16 and the heat of the compressed air can ignite the air/fuel mixture. The exhaust gases can be exhausted from the cylinders 20 and into the exhaust system 18. In some instances, the diesel engine system 10 can include a turbo 26 that pumps additional air into the cylinders 20 for combustion with the fuel and air drawn in from the intake manifold 14.

The exhaust system 18 can include exhaust manifolds 28, 30, exhaust conduits 29, 31, a catalyst 38, a diesel particulate filter (DPF) 40 and a heater 41. First and second exhaust segments can be defined by the first and second cylinder banks 22, 24. The exhaust manifolds 28, 30 can direct the exhaust segments from the corresponding cylinder banks 22, 24 into the exhaust conduits 29, 31. The exhaust can be directed into the turbo 26 to drive the turbo 26. A combined exhaust stream can flow from the turbo 26 through the catalyst 38 and the heater 41 to the DPF 40. The DPF 40 can filter particulates from the combined exhaust stream as it flows to the atmosphere. The heater 41 can selectively heat the exhaust stream flowing therethrough to regenerate the DPF 40, as explained in further detail below.

A control module 42 can regulate operation of the diesel engine system 10 according to the DPF regeneration control. More particularly, the control module 42 can communicate with an intake manifold absolute pressure (MAP) sensor 44 and an engine speed sensor 46. The MAP sensor 44 can generate a signal indicating the air pressure within the intake manifold 14 and the engine speed sensor 46 can generate a signal indicating engine speed (RPM). The control module 42 can determine an engine load based on the RPM and fueling rates. The fueling rate can generally be measured in fuel volume per combustion event. Engine output can be controlled via the fueling rate.

Figure 2:
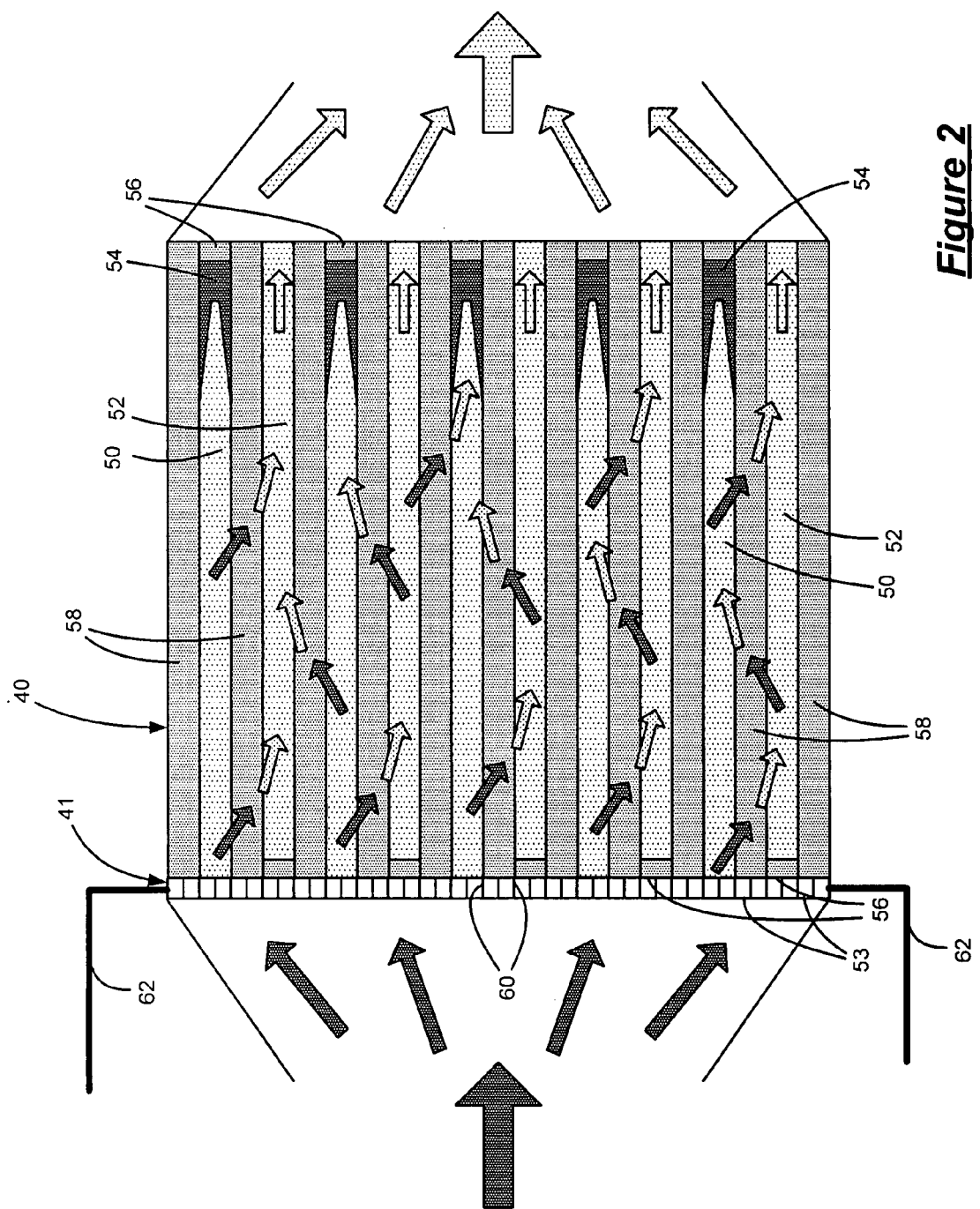
FIG. 2 is a schematic cross-section of a DPF including a heater.
Figure 3:
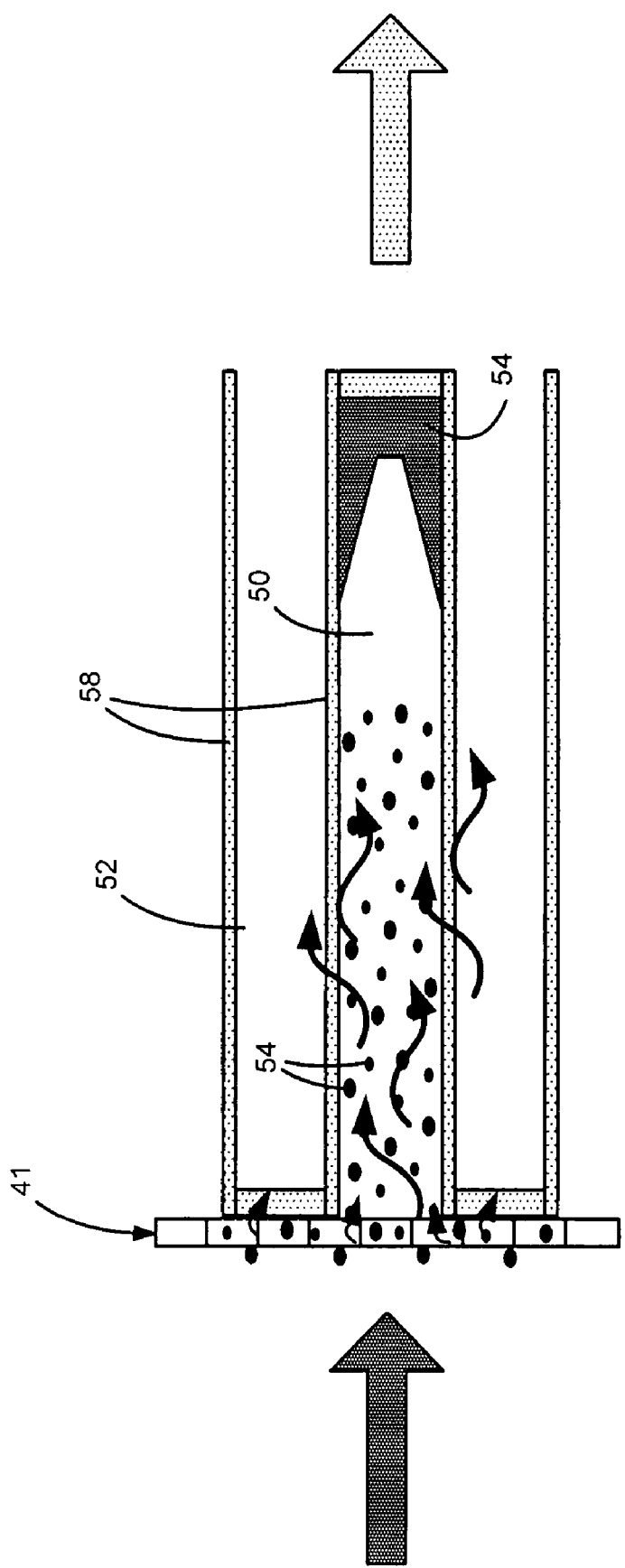
FIG. 3 is a schematic cross-section of a portion of the DPF of FIG. 2.

With particular reference to FIGS. 2 and 3, the DPF 40 can be a monolith particulate trap and can include alternating closed cells/channels 50 and open cells/channels 52. Exhaust gases such as those generated by the engine 12 can pass through channels 53 of the heater 41, enter the closed end channels 50 depositing particulate soot matter 54, and exit through the open channels 52. Plugs 56 can be used to seal the ends of the channels 50, 52. Walls 58 of the DPF 40 can be comprised of a porous ceramic honeycomb wall of cordierite material. It is appreciated that any ceramic comb material can be employed.

With further reference to FIG. 2, the heater 41 is shown in contact with and upstream of the DPF 40. Alternatively, heater 41 can be offset a distance from the DPF 40. The heater 41 can be a resistive heater that includes a plurality of resistive elements 60 and electrical terminals 62. The electrical terminals 62 can be connected to a power source 66 (see FIG. 1). When operating in a regeneration mode, electrical current can selectively flow across the heater 41 inducing heating of the resistive elements 60. More specifically, when DPF regeneration is desired, an electric current can be applied to the resistive elements 60 to generate heat.

With particular reference to FIG. 3, heat can be transferred to the soot particles 54 flowing through the channels 53 during the DPF regeneration process. Sufficient heat can be transferred to induce exothermic combustion of the soot particles 54, releasing additional heat. The heat can flow into the DPF 40 heating the soot particles 54 therein. As a result, a cascading effect can be achieved through the DPF 40, whereby heat generated through combustion of upstream soot particles 54 induces combustion of downstream soot particles 54. In other words, the heater 41 can function as an ignition catalyst that ignites or lights off the upstream soot particles 54, the combustion heat of which, in turn lights off the downstream soot particles 54. In this manner, all of the soot particles 54 within the DPF 40 can be combusted to regenerate the DPF 40.

The DPF regeneration process can be periodically initiated to regenerate the DPF 40. More specifically, the control module 42 can estimate loading of the DPF. When the estimated loading achieves a threshold level (e.g., 5 grams/liter of particulate matter) and the exhaust flow rate is within a desired range, current can be applied to the heater 41 to initiate the regeneration process. The duration of the regeneration process can vary based upon the amount of particulate matter within the DPF 40. It is anticipated, that the regeneration process can last between 2-6 minutes. The electrical heater 41, however, is only implemented during an initial portion of the regeneration process. More specifically, the electric heater 41 heats the exhaust flowing therethrough for a threshold period (e.g., 1-2 minutes). The remainder of the regeneration process is achieved using the heat generated by combustion within the DPF 40.

Figure 4:
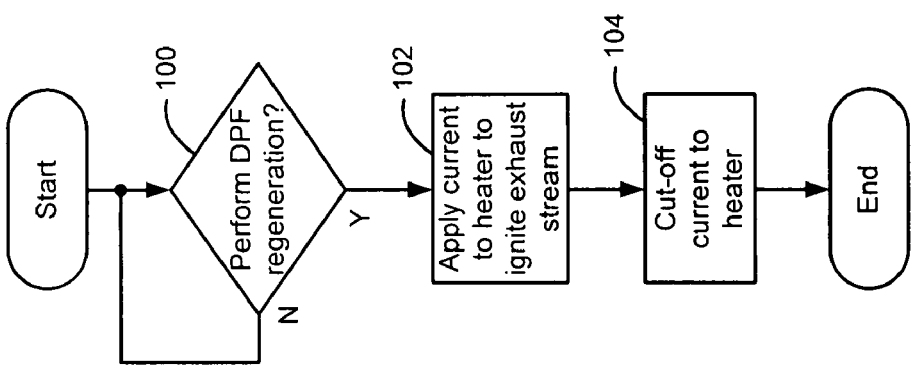
FIG. 4 is a flowchart illustrating DPF regeneration control.

Referring now to FIG. 4, a flowchart illustrates an example DPF regeneration control. In step 100, control can determine whether DPF regeneration is to be performed. As described above, DPF regeneration can be initiated when a particulate amount within the DPF 40 exceeds a threshold amount and the exhaust flow rate exceeds a threshold flow rate. If control determines that DPF regeneration should not be performed, control can loop back. If control determines that DPF regeneration should be performed, control can provide current to the electrical heater 41 in step 102. As described in further detail above, the electrical heater 41 can heat the exhaust flowing therethrough to initiate combustion of the exhaust. The heat generated by the combustion process can further induce combustion of the soot particles within the DPF 40 to regenerate the DPF 40. In step 104, control can cut-off current to the heater after a threshold period has expired (e.g., 1-2 minutes) and control can end.

Figure 5:
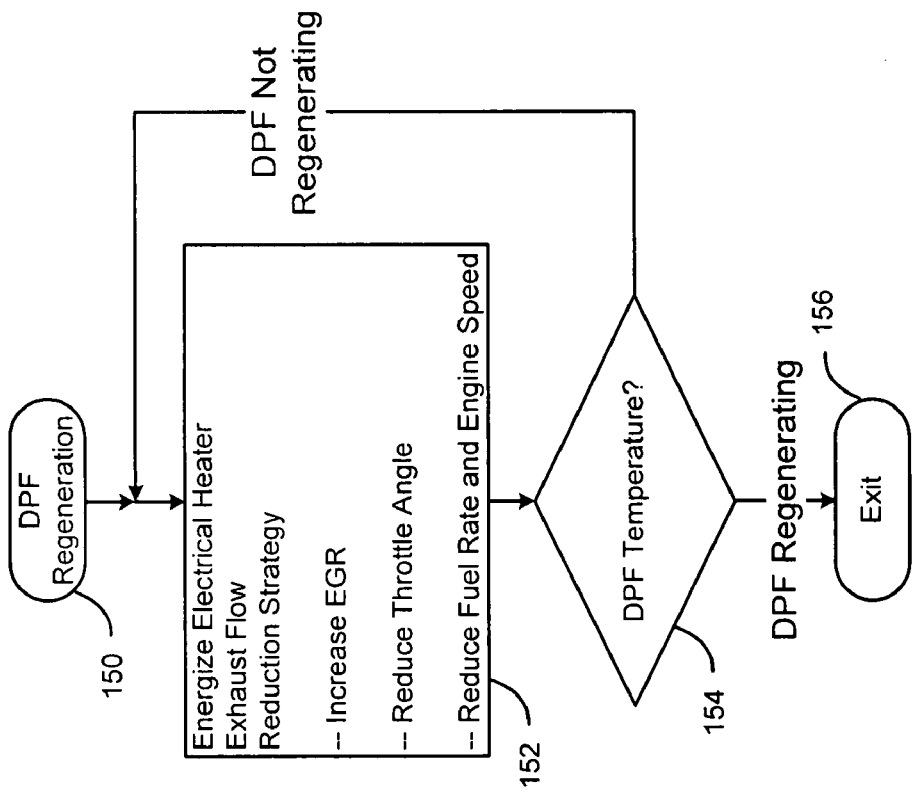
FIG. 5 is a flowchart illustrating exhaust flow control during startup of the Electrically Heated DPF.

Turning now to FIG. 5, an electrical DPF regeneration startup control strategy is designed to operate in conjunction with the DPF Regeneration with Resistive Surface Heating. As detailed above, DPF Regeneration is achieved by heating a grid or other heating element positioned at the inlet of the filter so that the soot combustion propagates down the length of the DPF channels. However, heating the electrical grid with the smallest amount of electrical power can improve fuel economy. Heating the electrical grid with the smallest amount of electrical power can also reduce issues generated by integrating the large electrical load into the vehicles.

One approach to reduce the electrical power is to reduce thermal losses due to the engine's exhaust flow. Exhaust flow is a significant parasite requiring the grid to use more power to achieve the desired operating temperature. The electrical DPF startup control process can use the available engine systems to reduce engine exhaust flow without severely affecting overall engine performance.

The process can operate by limiting exhaust flow while the electrical grid is heating to the desired soot combustion temperature. For example, DPF regeneration can start during an idle or deceleration at step 150 in order to activate the electrically heated DPF by heating the electrical grid. Upon startup of the DPF regeneration, a routine can be called at step 152 that can increase Exhaust Gas Recirculation (EGR), reduce throttle angle, and reduce fuel rate and engine speed. In some embodiments EGR can be increased to a predetermined set point maximum value. Throttle angle, fuel rate and engine speed can be reduced to predetermined set point minimum values. In other embodiments, EGR can be increased to an adaptively determined maximum value and throttle angle and fuel rate and engine speed can be reduced to adaptively determined minimum values within present operating parameters of the engine control system. In still other embodiments, some of these values can be predetermined setpoints, while others are adaptively determined values.

Next, temperature of the DPF can be measured, estimated or calculated to determine when regeneration occurs at decision step 154. The temperature of the DPF can be calculated as follows:

$$\text{DPF Temperature} = \text{Start Temp} + \{ \text{Energy Added/Mass} - \text{Heat Loss} \}$$

where Heat Loss can be calculated as follows:

$$\text{Heat Loss} = K * \text{Exhaust Flow} * \text{Start Temp},$$

where K can be a sensed temperature of the exhaust exiting the DPF. The DPF can be determined to be regenerating or active when the DPF Temperature exceeds a predetermined threshold selected to represent the predetermined soot combustion temperature.

As long as the DPF is determined to be inactive or not regenerating, the EGR, throttle angle, and fuel rate and engine speed can be kept at increased, reduced, and reduced levels, respectively. For example, in some embodiments, the EGR, throttle angle, and fuel rate and engine speed can be maintained at their predetermined set point, maximum, minimum, and minimum values, respectively. Alternatively, in some embodiments, one or more of the EGR, throttle angle, and fuel rate and engine speed can be continuously updated so as to be kept at their adaptively determined maximum, minimum, and minimum values, respectively. Once the temperature of the DPF is determined to indicate that the DPF is regenerating, the limiting of the exhaust flow can be ceased. The process exited at step 156.

Figure 6:
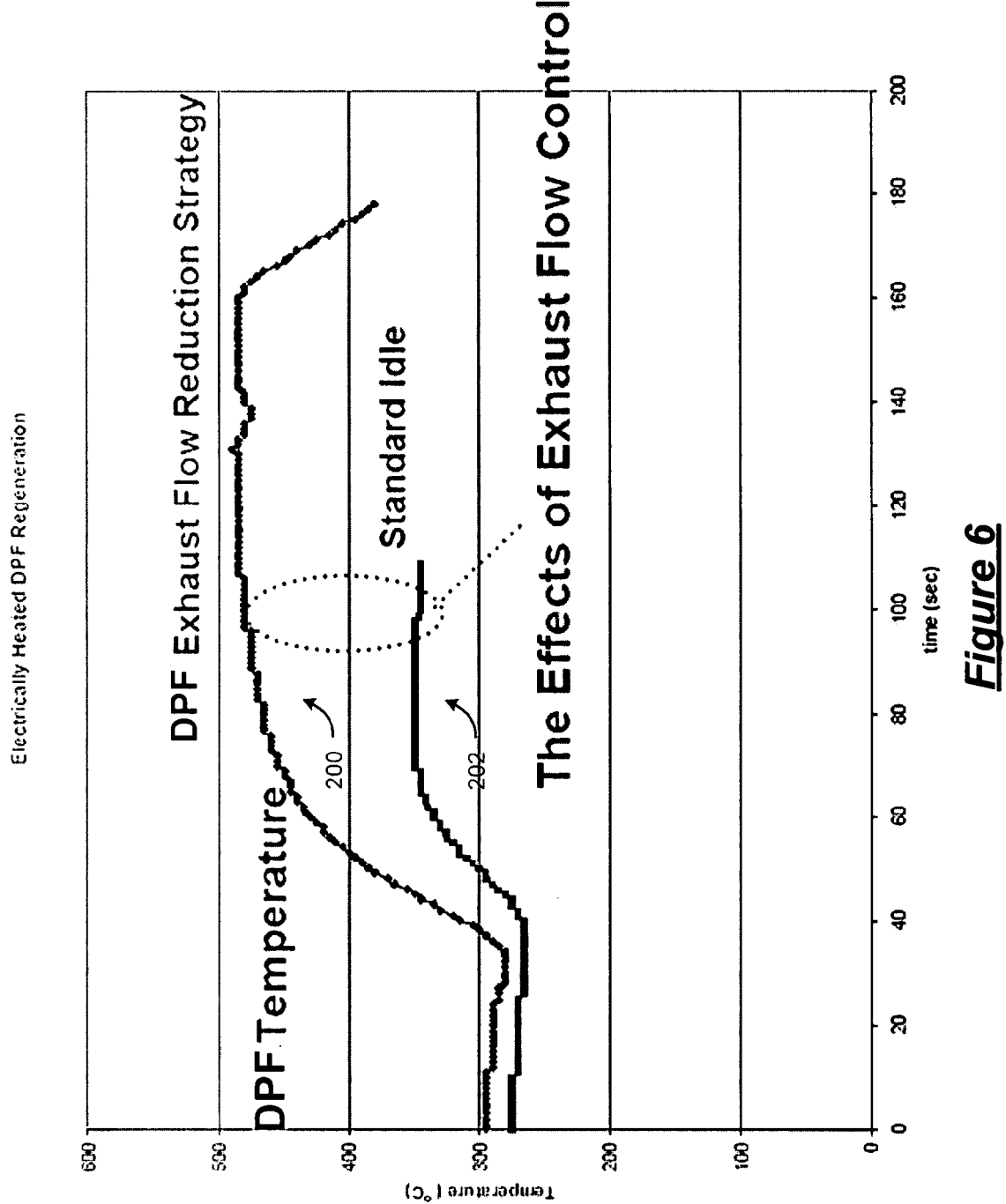
FIG. 6 is a graphical representation illustrating effects of exhaust flow control.

Turning now to FIG. 6, by increasing EGR, reducing the throttle angle, and cutting the fuel rate and engine speed, exhaust flow can be reduced nearly in half while the electrical grid is heated. This improved heating performance 200 results in heating of the DPF to a higher temperature in a shorter amount of time while requiring significantly less energy compared to a standard idle 202. Therefore, the accomplishments of the exhaust flow reduction control are significant.

What is claimed is:

1. An exhaust system that processes exhaust generated by an engine, comprising:
    a diesel particulate filter (DPF) that is disposed downstream of the engine and that filters particulates in said exhaust;
    an electrical heater that is disposed upstream of said DPF and that selectively heats said exhaust to initiate combustion of said particulates, wherein heat generated by combustion of said particulates in said heater induces combustion of particulates within said DPF; and
    a control module that selectively enables current flow to said electrical heater for an initial period of a DPF regeneration cycle, wherein said control module reduces fuel rate and engine speed settings below fuel rate and engine speed settings used during normal idle operation of said engine to limit exhaust flow while said electrical heater is heating to a predetermined soot combustion temperature, wherein, upon startup of the DPF regeneration cycle, the control module increases opening of an exhaust gas recirculation (EGR) valve more than an EGR opening used during normal idle operation of said engine.

2. The system of claim 1, wherein, upon startup of the DPF regeneration cycle, the control module reduces throttle angle.

3. The system of claim 1, wherein the control module reduces a throttle angle setting below a throttle angle setting value used during normal idle operation of said engine.

4. The system of claim 1, wherein said control module selectively discontinues the current flow to said electrical heater based on a temperature of said DPF.

5. The system of claim 1, wherein said control module selectively enables current to flow to said electrical heater based on a particulate amount within said DPF.

6. The system of claim 5, wherein said control module selectively enables current to flow to said electrical heater based on an exhaust flow rate.

7. The system of claim 1, wherein said control module determines whether DPF regeneration will continue without the electrical heater being supplied current and limits the exhaust flow until a regeneration condition is met.

8. The system of claim 7, wherein said control module, upon determining that DPF regeneration will continue without electrical heater energization, ceases limiting the exhaust flow.

9. The system of claim 7, wherein said control module determines whether DPF regeneration will continue by calculating a temperature of the DPF and compares the temperature of the DPF to the predetermined soot combustion temperature.

10. The system of claim 9, wherein said control module calculates the temperature of the DPF as a function of start temperature, energy added, mass and heat loss.

11. The system of claim 10, wherein the heat loss is calculated as a function of exhaust flow and start temperature.

12. A method of regenerating a diesel particulate filter (DPF) of an exhaust system, comprising:
    generating exhaust including particulates therein;
    selectively enabling current flow to an electrical heater for an initial period of a DPF regeneration cycle;
    heating said exhaust upstream of said DPF using said electrical heater to induce combustion of said particulates;
    directing heat generated by combustion of said particulates into said DPF to induce combustion of particulates within said DPF;
    selectively reducing fuel rate and engine speed settings below fuel rate and engine speed settings used during normal idle operation of an engine to limit exhaust flow while the electrical heater is heating to a predetermined soot combustion temperature; and
    upon startup of the DPF regeneration cycle, increasing opening of an exhaust gas recirculation (EGR) valve more than an EGR opening used during normal idle operation of said engine.

13. The method of claim 12, further comprising, upon startup of the DPF regeneration cycle, limiting the exhaust flow by reducing a throttle angle.

14. The method of claim 12, wherein said heating said exhaust occurs at an inlet of said DPF.

15. The method of claim 12, wherein selectively enabling current to flow through an electric heater is based on determining a particulate amount within said DPF.

16. The method of claim 15, wherein said selectively enabling current flow is based on an exhaust flow rate.

17. The method of claim 12, further comprising selectively discontinuing the current flow to the electric heater based on a temperature of said DPF.

18. The method of claim 17, further comprising calculating the temperature of said DPF as a function of start temperature, energy added, mass and heat loss.

19. The method of claim 18, further comprising calculating the heat loss as a function of exhaust flow and start temperature.

* * * * *